March 26, 1963 W. T. WINTRINGHAM 3,083,264

SUM AND DIFFERENCE STEREOPHONIC TRANSMISSION WITH NEGATIVE FEEDBACK

Filed Dec. 10, 1959

5 Sheets-Sheet 1

INVENTOR
W. T. WINTRINGHAM
BY Harry C. Hart
ATTORNEY

INVENTOR
W. T. WINTRINGHAM
BY Harry C. Hart
ATTORNEY

INVENTOR
W. T. WINTRINGHAM
BY Harry C. Hart
ATTORNEY

INVENTOR
W. T. WINTRINGHAM
BY Harry C. Hart
ATTORNEY

INVENTOR
W. T. WINTRINGHAM
BY Harry C. Hart
ATTORNEY

United States Patent Office 3,083,264
Patented Mar. 26, 1963

3,083,264

SUM AND DIFFERENCE STEREOPHONIC TRANSMISSION WITH NEGATIVE FEEDBACK

William T. Wintringham, Chatham, N.J., assignor to Bell Telephone Laboratories, Incorporated, New York, N.Y., a corporation of New York Filed Dec. 10, 1959, Ser. No. 858,679
10 Claims. (Cl. 179—1)

This invention is concerned with stereophonic reproduction of sound. Its objects are to improve the fidelity of reproduction, to simplify the reproducing apparatus, and to reduce its cost.

In a two-channel stereophonic system, sounds originating in a spatially distributed source such as a broadcast studio and picked up by a left microphone and a right microphone, respectively, are individually reproduced at a distant point, for example an auditorium or the listener's home, by a left reproducer and a right reproducer. Identity, or identifiability, of the signals originating in the respective microphones being maintained throughout transmission to the reproducers, the listener receives the correct impression of the spatial distribution of the sound source. For identifiability of these signals it is not necessary that they be transmitted over spatially independent channels but only, if they are combined for transmission, that they be combined according to some systematic rule or plan such that they can be reliably disentangled for reproduction.

One known way in which the microphone signals can be systematically combined for transmission is to generate, on the one hand a half sum signal and, on the other hand, a half difference signal. Designating the signal delivered by the left microphone as L and that by the right microphone as R this technique contemplates the formation of a signal $\frac{1}{2}(L+R)$ and of another signal $\frac{1}{2}(L-R)$. These signals are independently transmitted to the receiver station at which point a new sum and a new difference are formed, this time of the transmitted signals, thus to recover the original signals L and R; i.e., $$\frac{1}{2}(L+R)+\frac{1}{2}(L-R)=L$$
$$\frac{1}{2}(L+R)-\frac{1}{2}(L-R)=R$$

An advantage of this system is said to be that it is wholly compatible with single-reproducer apparatus inasmuch as the half sum signal indeed represents the average of the sounds reaching the two microphones.

Suitable apparatus for generating the sum and difference signals, respectively (from here on the factor of ½ will be disregarded) is found in a three-winding transformer or "hybrid coil" and it is with such apparatus that the system is instrumented, for example, in A. D. Blumlein Patent 2,093,540, September 21, 1937.

The many advantages offered by strong negative feedback in compensating for the imperfections of amplifier apparatus components are well known. These advantages are especially great in the case of a high power receiver amplifier in which the apparatus components are normally driven to the limit of their capacity. The feedback signal is preferably applied to a suitable point of an early stage of the amplifier, and for best results it is imperative that it be derived at a point of the amplifier that is as close as possible, electrically, to the reproducer; in particular that it be derived from the secondary winding of the output transformer. In other words, best results are obtained from the negative feedback when the largest possible number of amplifier components are included in the feedback loop.

When a hybrid coil or other conjugate network is employed to intercouple the output stage of the $L+R$ amplifier with that of the $L-R$ amplifier, thus deriving from these two elements an L signal and an R signal for delivery to the left and right reproducers, respectively, it is impossible to find a ready point of access in the secondary winding circuit of the hybrid at which either an $L+R$ signal or an $L-R$ signal can be obtained for feedback purposes.

The present invention cures this shortcoming of the sum and difference system by utilizing, to reproduce the left sound wave and the right sound wave, respectively, reproducers that are provided with two driving coils. The $L+R$ signal and the $L-R$ signal are supplied individually, from the $L+R$ amplifier and the $L-R$ amplifier, respectively, to both driving coils of each reproducer, in additive phase relation in one reproducer and in subtractive phase relation in the other. The recombination of these applied signals is then carried out mechanically, rather than electrically, so that the required L signal and R signal reappear for the first time as movements of the diaphragms of the two reproducers, and consequently as sound waves. Thus identity of the amplifier signal, $L+R$ in the one case and $L-R$ in the other case, is maintained all the way from the input stage of the amplifier to the driving coils of the reproducer, and the signal required for negative feedback purposes may be tapped beyond the last component of the amplifier so that all components of the amplifier may be included in the feedback loop. In addition, the hybrid coil of the conventional system is dispensed with, its recombining action being carried out, instead, by the resultant diaphragm movements.

In an ideal two-coil reproducer there is no electromagnetic coupling between either driving coil and the other. However, the two driving coils are normally mounted on a common axis and manufacturing considerations sometimes dictate that they be located close together. Hence, as a practical matter, there sometimes exists electromagnetic coupling between the two driving coils of such a reproducer whereby, aside from diaphragm movement, the current in each coil depends, more or less, on the current in the other coil. This situation makes for undesired "crosstalk" between the $L+R$ signal and the $L-R$ signal. If the resulting distortion is objectionable it can be obviated by assuring that the currents in the two driving coils of each reproducer be alike. This assurance can be had by restoring the hybrid coils as a signal combining device, deriving from it an L signal and an R signal, and delivering these signals to both voice coils of each reproducer. The use of reproducers having two separate driving coils still offers advantages in the simplification of a resistor network interconnecting the driving coils to provide access points at which the required negative feedback signals may be found.

If reproducers having two separate driving coils are not available it is still possible to construct a network of resistors, coupled to the output windings of the hybrid coils and the single driving coils of the two reproducers, from which the required negative signals may be derived.

The invention will be fully apprehended from the following detailed description of illustrative embodiments thereof taken in connection with the appended drawings in which.

Figure 1:
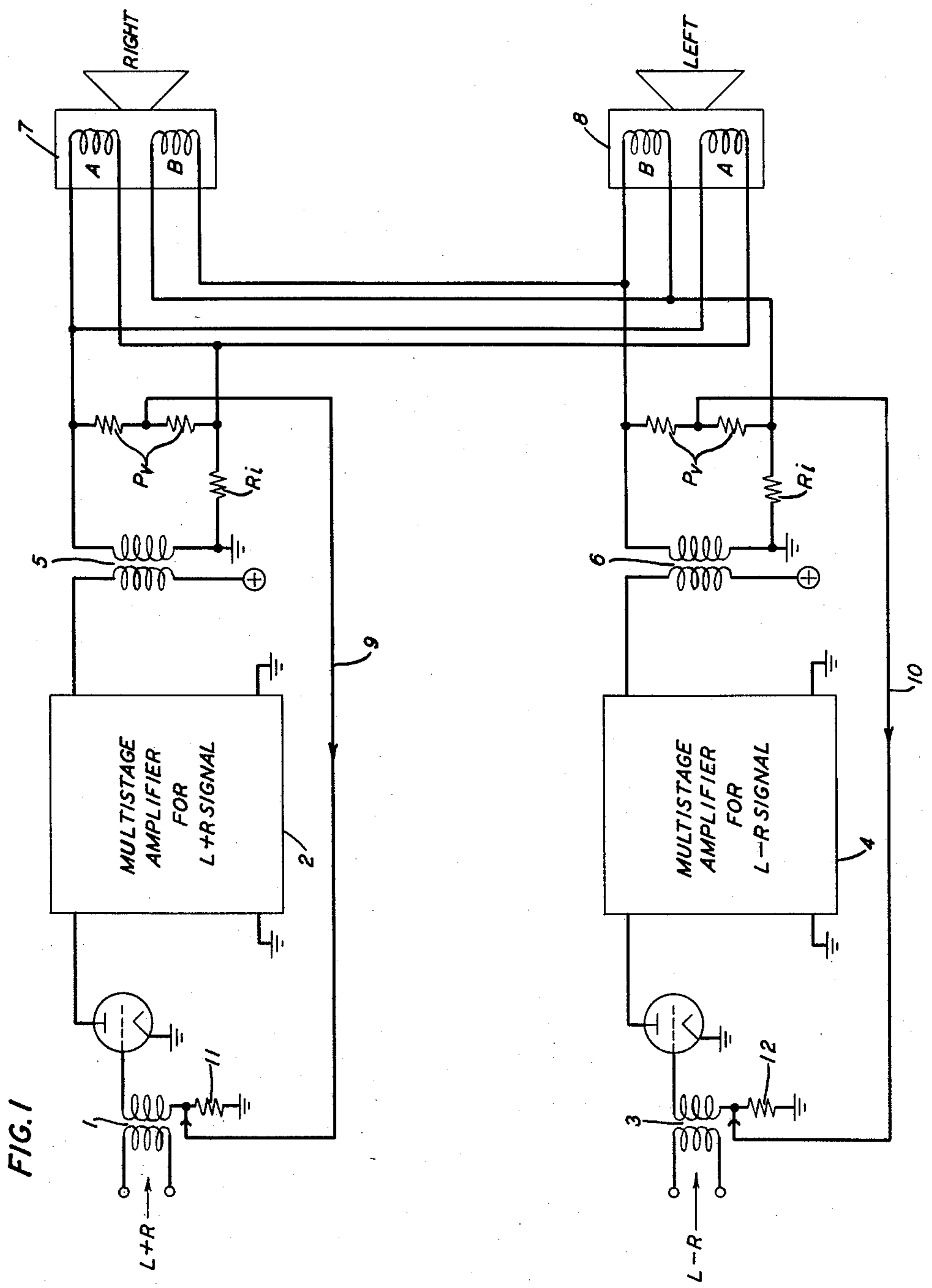
FIG. 1 is a schematic circuit diagram showing stereophonic receiver apparatus embodying the invention.

Referring now to the drawings, FIG. 1 shows apparatus embodying the invention. It contemplates that, at a distant studio, the L signal output of a left microphone and the R signal output of a right microphone shall have been combined into an $L+R$ signal and an $L-R$ signal, and that these signals shall have been transmitted to a receiver station where the $L+R$ signal appears on the primary winding of the input transformer 1 of an $L+R$ amplifier 2 and, similarly, the $L-R$ signal appears on the primary winding of the input transformer 3 of an $L-R$ amplifier 4. These two amplifiers may be identical in their characteristics and responses and each may contain as many stages as may be dictated by gain requirements. Of these stages the input part of the first stage and the output part of the last stage are shown in each case, the remainder merely being indicated.

In each case the last element of the output stage of the amplifier is a conventional two-winding power transformer 5, 6. Two reproducers 7, 8 are provided, identified as right and left. Each is provided with two driving coils designated "A" and "B." The terminals of the secondary winding of the $L+R$ output transformer 5 are connected to the A driving coils of both reproducers in parallel and the terminals of the secondary winding of the output transformer 6 of the $L-R$ amplifier are connected to the B driving coils of both reproducers, likewise in parallel but with a phase shift of 180 degrees as between the two driving coils. With this arrangement the movements of the diaphragm of the left reproducer 8 are proportional to the sum of the currents in its driving coils; i.e., its movements are proportional to $(L+R)+(L-R)$. Similarly, in the case of the right reproducer 7 and because of the phase reversal, the movements of its diaphragm are proportional to $(L+R)-(L-R)$. Hence the sound waves delivered by the left reproducer 8 are proportional to the L signal output of the left microphone and the sound waves delivered by the right reproducer 7 are proportional to the R signal output of the right microphone and the listener receives the correct impression of spatial distribution of the original sound source.

Because of the back electromotive force which arises in the case of the movement of a coil carrying a current in a magnetic field, specifically the movements of the driving coils of the right and left reproducers 7, 8, the current through the secondary winding of each output transformer 5, 6 is not in exact proportion to the voltage across it. Hence, for optimum stabilization of each amplifier 2, 4 against the effects of departures of its component elements from their ideal values, combined current feedback and voltage feedback to an early stage of each amplifier is advantageous. With the system of FIG. 1 this is readily secured merely by the inclusion of a small resistor $R_i$ in series with each of the secondary windings of the output transformers 5, 6 and a voltage divider $P_v$ composed of a high resistor, having an appropriately located tap, connected in shunt with the winding. A conductor 9, 10, connected to the tap thus carries a signal which combines a certain proportion of current feedback, dependent on the magnitude of the resistance $R_i$, and a certain proportion of voltage feedback, dependent on the location of the tap. This composite feedback signal is applied to an early stage of the amplifier. It may be applied in any convenient way, e.g., across an auxiliary resistor 11, 12 connected in series with the secondary winding of the input transformer 1, 3 and hence to the control electrode of the first stage of the amplifier 2, 4. In accordance with known principles care must, of course, be exercised to select, for the point of application of this feedback signal, a point such that the effect of the feedback will be degenerative; negative feedback in contrast to positive feedback.

Figure 2:
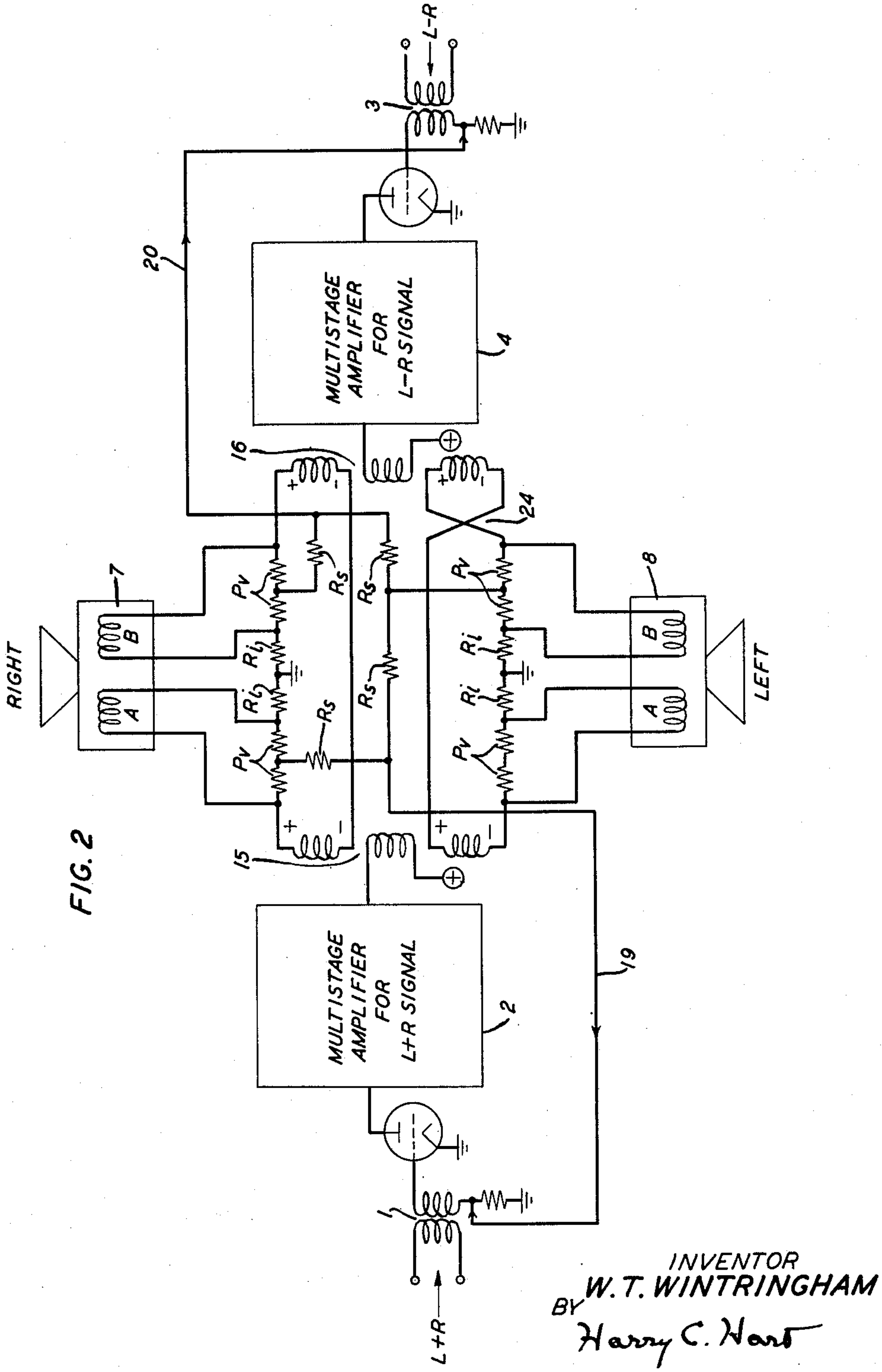
FIGS. 2 and 3 are schematic circuit diagrams showing two different modifications of the system of FIG. 1.

Because the two driving coils of each reproducer 7, 8 are normally so mounted as to make for electromagnetic coupling between them, the apparatus of FIG. 1 is, in principle, open to the objection that some undesired cross-talk may exist between the two driving coils A, B, of each reproducer. If convenient to eliminate this cross-talk by other means it can be eliminated by ensuring that the currents in the two driving coils of each reproducer shall be alike. This result is secured by resorting to three-winding transformers 15, 16 in place of the two-winding transformers 5, 6 of FIG. 1. Apparatus of this kind is shown in FIG. 2. As in the case of prior systems the recombination of the $L+R$ signal and the $L-R$ signal are here carried out by the three-winding transformers 15, 16 for delivery, as L signals to both driving coils A, B of the left reproducer 8 and as R signals to both driving coils A, B of the right reproducer 7. With the transformer windings poled as shown by the "+" and "—" signs, the cross-over 24 between the lower secondary windings, not duplicated in the case of the upper ones, gives the desired result of additive recombination in the one case and subtractive recombination in the other. To avoid complexity of the drawing the $L+R$ signal is indicated, in this figure and in the figures to follow, as arriving from the left and the $L-R$ signal is indicated as arriving from the right, while the two reproducers are shown as facing in opposite directions. It is to be understood that in practice the two reproducers 7, 8 shall normally face in the same direction and the two incoming signals shall normally reach the apparatus at two input points located, usually, close together.

With this arrangement a voltage divider resistor indicated as $P_v$ is connected across each driving coil and a small current feedback resistor $R_i$ is connected between one terminal of each driving coil and ground. Summing resistors $R_s$ are connected in the manner shown to the taps of the voltage divider resistors, and the currents flowing through these summing resistors are combined in one way to provide composite current and voltage feedback proportional to the sum signal $L+R$ for delivery over a conductor 19 to an early stage of the $L+R$ amplifier 2, and in another way to provide composite current and voltage feedback proportional to the difference signal $L-R$ for delivery over a conductor 20 to an early stage of the $L-R$ amplifier 4. The operation of this resistor network is thus to undo, for feedback purposes only, the signal recombination carried out by the three-winding transformers 15, 16. It thus provides suitable feedback access points beyond the output windings of the three-winding transformers 15, 16 and so includes these windings in the feedback loops.

Figure 3:
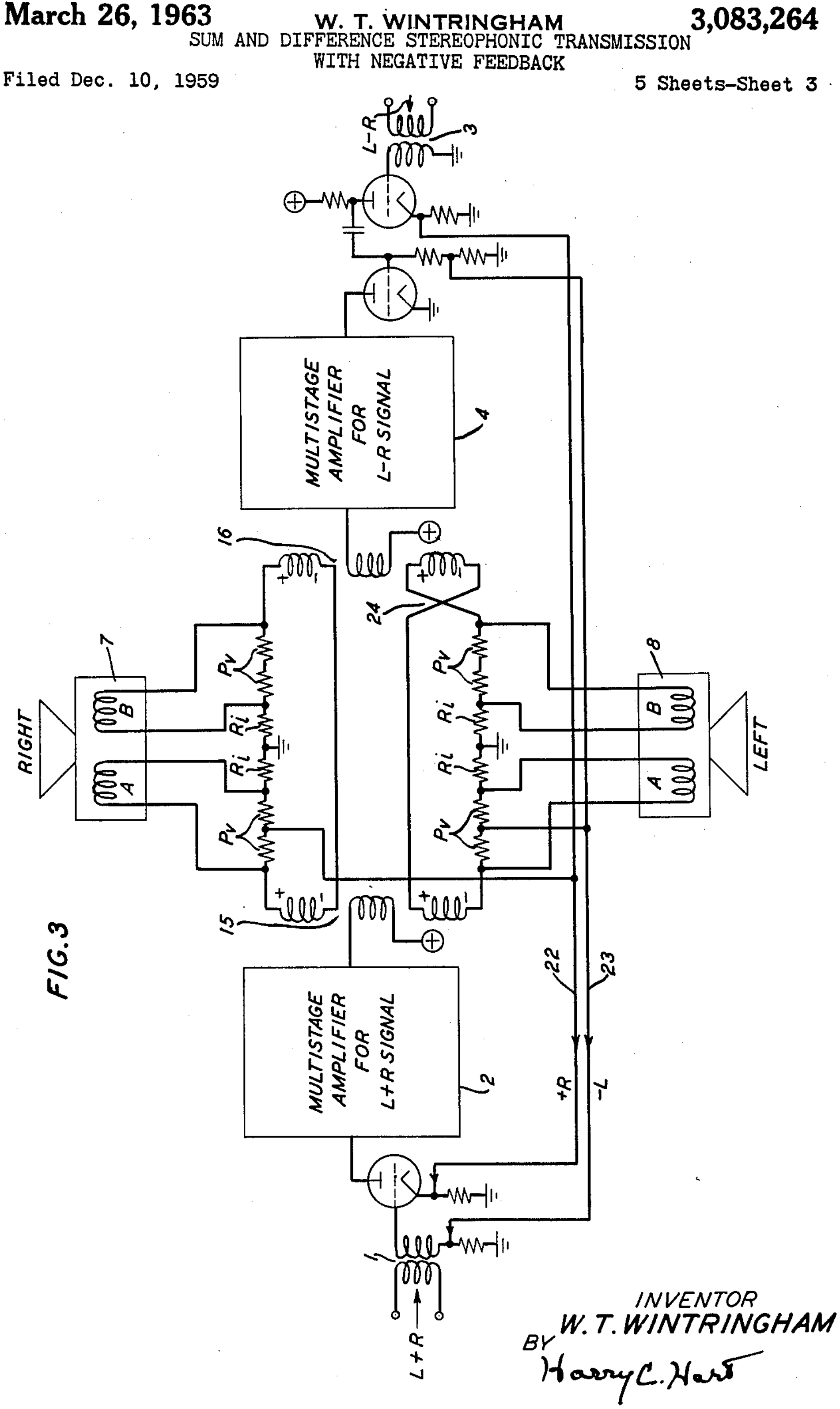

FIG. 3 shows a modification of the apparatus of FIG. 2 in which, by carrying out the recombination of an R feedback signal with an L feedback signal at the points to which these feedback signals are applied, instead of at the points at which they are derived, a simplification of the resistor network of FIG. 2 is achieved. Consideration of the connections shows that with application of a +R feedback signal over a conductor 22 to the cathode of an early stage of the $L+R$ amplifier 2 and of a —L feedback signal to the control electrode of the same stage, the phase inversion inherently carried out by the stage results in a subtractive recombination of these two feedback signals thus to provide, in effect, an $L+R$ feedback signal to the $L+R$ amplifier. In the case of the $L-R$ amplifier the +R feedback signal is applied to the cathode of one stage while the —L feedback signal is applied to the control electrode of a different stage, in this case the following one. With this arrangement the phase inversion accomplished between grid and cathode of any stage is balanced by the phase inversion that takes place from one stage to the next so that the combination of the +R signal with the —L signal is additive to provide a net $L-R$ feedback signal. The stages to which the feedback signals are applied should, of course, be selected in each case in such a way that the feedback is negative in contrast to positive.

Figure 4:
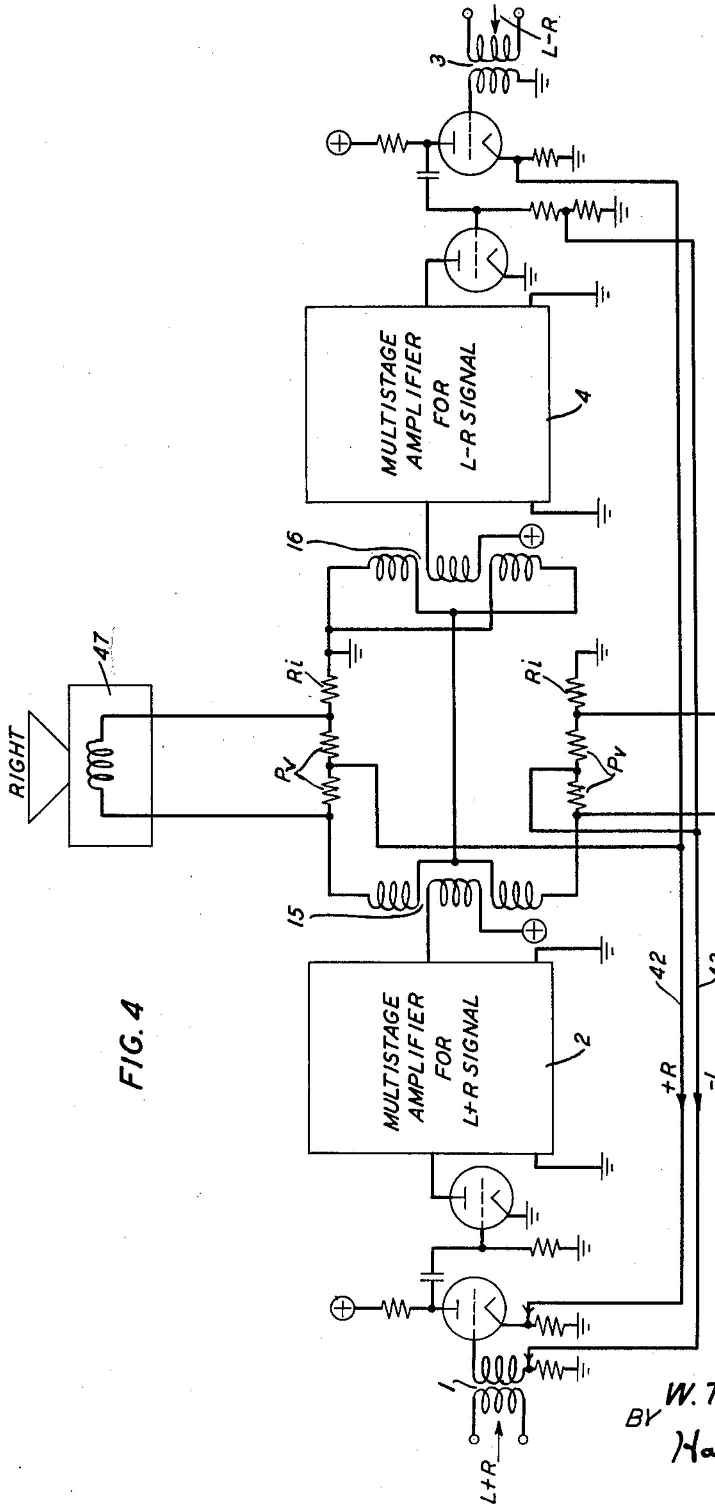
FIGS. 4 and 5 are schematic circuit diagrams showing stereophonic receiver apparatus including a resistor network for the derivation of negative feedback signals.

FIG. 4 shows a circuit arrangement which may be employed when reproducers having two driving coils are not available. Here recombination of the $L+R$ signal with the $L-R$ signal to form an L signal and an R signal for delivery to the right reproducer 47 and to the left reproducer 48, respectively, are carried out by three-winding transformers 15, 16. A composite voltage and current feedback signal R derived from the right reproducer 47 is applied to the cathode of the first stage of the *L+R* amplifier 2 and, in the same phase, to the cathode of the first stage of the *L—R* amplifier, while a composite current and voltage feedback signal —L derived from the left reproducer 48 is applied to the grid of the first stage of the *L+R* amplifier and to the grid of the second stage of the *L—R* amplifier. With this arrangement the recombination of the feedback signals is subtractive in the *L+R* amplifier while it is additive in the *L—R* amplifier. As in the case of FIG. 3, care must, of course, be exercised to select the points to which the feedback signals are applied in such a way that their effects are degenerative.

Figure 5:
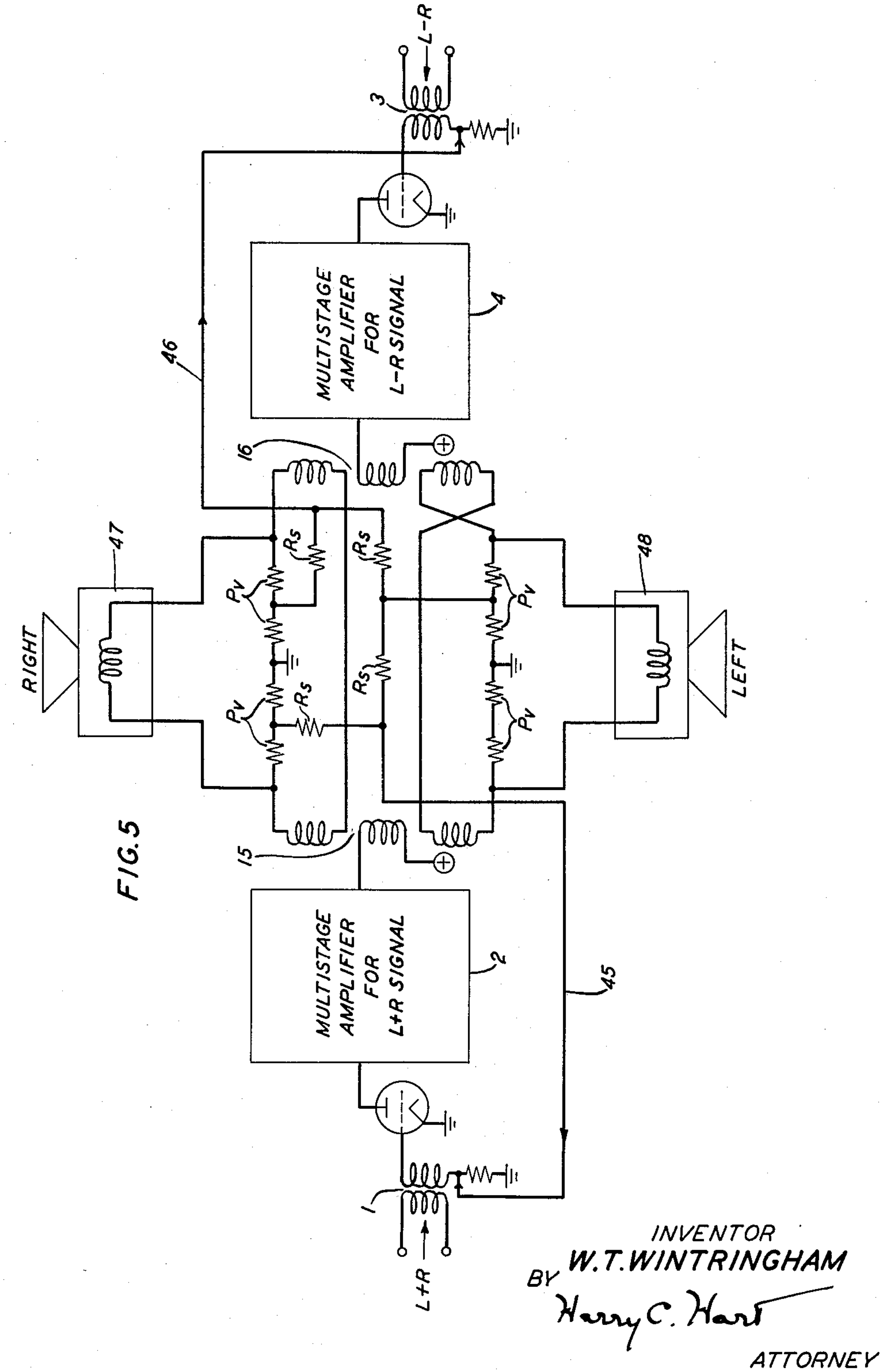

Given the arrangement of FIG. 4, some simplification of the resistor network can be achieved, with but small sacrifice in most cases, by omission of the current component of the feedback signal. A system of this type is shown in FIG. 5, wherein voltage feedback signals derived from divider resistors connected across the output windings of the two three-winding transformers are additively combined through summing resistors $R_s$ for delivery as an *L+R* voltage feedback signal to an early stage of the *L+R* amplifier and as an *L—R* voltage feedback signal for delivery to an early stage of the *L—R* amplifier.

Various modifications of detail of the systems described above and combinations of their various features will suggest themselves to those skilled in the art.

What is claimed is:

1. In a two-channel stereophonic system for audibly reproducing a left sound wave and a right sound wave from received sum and difference signals, a first amplifier for amplifying an incoming sum signal, a second amplifier for amplifying an incoming difference signal, a left reproducer and right reproducer, each of said reproducers having two electrically independent driving coils that are mechanically coupled together, connections for feeding said sum signal and said difference signal to the coils of said left reproducer in a preassigned phase relation, and connections for feeding said sum signal and said difference signal to the coils of said right reproducer in opposite phase relation, whereby the movements of the diaphragms of said reproducers in response to the currents in their coils act to recombine said signals and to reproduce left sound waves and right sound waves, respectively.

2. Apparatus as defined in claim 1 wherein the final element of each amplifier is a power transformer having a primary winding and a secondary winding, wherein the terminals of the secondary winding of the first amplifier are connected to the first coils of both reproducers in parallel and in one phase, and wherein the terminals of the secondary winding of the second amplifier are connected to the second coils of both reproducers in parallel and in opposite phase.

3. In combination with apparatus as defined in claim 2, a divider network connected across the secondary winding of the power transformer of each amplifier, said network having a tapping point, and a negative feedback path extending from said tapping point to a feedback input point of an early stage of said amplifier.

4. In a two-channel stereophonic system for audibly reproducing a left sound wave and a right sound wave from received sum and difference signals, a first amplifier for amplifying an incoming sum signal, a second amplifier for amplifying an incoming difference signal, each of said amplifiers including an output transformer having a primary winding and a secondary winding, a left reproducer and a right reproducer, each of said reproducers having two electrically independent driving coils that are mechanically coupled together, connections extending from the terminals of the secondary winding of the first amplifier to the first coils of both reproducers in one phase, connections extending from the terminals of the secondary winding of the second amplifier to the second coils of both reproducers in opposite phase, whereby the movements of the diaphragms of said reproducers in response to the currents in their coils act to recombine said signals and to reproduce left sound waves and right sound waves, respectively, a resistor connected in series between the secondary winding of the power transformer of each amplifier and the two reproducer coils to which it is connected, means for deriving a control voltage from said resistor, and means for feeding back said control voltage in degenerative phase to an input point of an early stage of said amplifier.

5. In a two-channel stereophonic system for audibly reproducing a left sound wave and a right sound wave from received sum and difference signals, a first amplifier for amplifying an incoming sum signal, a second amplifier for amplifying an incoming difference signal, each of said amplifiers including an output transformer having a primary winding and a secondary winding, a left reproducer and a right reproducer, each of said reproducers having two electrically independent driving coils that are mechanically coupled together, connections extending from the terminals of the secondary winding of the first amplifier to the first coils of both reproducers in one phase, connections extending from the terminals of the secondary winding of the second amplifier to the second coils of both reproducers in opposite phase, whereby the movements of the diaphragms of said reproducers in response to the currents in their coils act to recombine said signals and to reproduce left sound waves and right sound waves, respectively, a first resistor connected in series between the secondary winding of the power transformer of each amplifier and the two reproducer coils to which it is connected, a second and a third resistor connected in series across said secondary winding and said first resistor, and a negative feedback path extending from the common point of said second and third resistors to a feedback input point of an early stage of said amplifier.

6. Apparatus as defined in claim 5 wherein said first resistor is proportioned to develop a current feedback signal and wherein said second and third resistors are proportioned to develop a voltage feedback signal.

7. In a two-channel stereophonic system for audibly reproducing a left sound wave and a right sound wave from received sum and difference signals, a first amplifier for received sum signals, a second amplifier for received difference signals, each amplifier having an output transformer, said transformers having primary and secondary windings, a left reproducer and a right reproducer, each reproducer having two electrically independent driving coils that are mechanically coupled together, connections extending from the secondary windings of both transformers to the driving coils of both reproducers and arranged to deliver signals to said coils in a manner to cause movements of the diaphragms of said reproducers in proportion to left sound waves and right sound waves, respectively, a first tapped resistor connected in shunt with each driving coil of each reproducer, a second tapped resistor connected in series between the second terminal of the first driving coil of each reproducer and the first terminal of the second driving coil of the same reproducer, a resistor network intercoupling said reproducer coils, means for deriving a sum control signal and a difference control signal from said network, and means for feeding back said control signals to early stages of said first amplifier and of said second amplifier, respectively, in degenerative phase relation with respect to said incoming signals.

8. In a two-channel stereophonic system for audibly reproducing a left sound wave and a right sound wave from received sum and difference signals, a first amplifier for received sum signals, a second amplifier for received difference signals, each amplifier having an output transformer, said transformers having primary and secondary windings, a left reproducer and a right reproducer, each reproducer having two electically independent driving coils that are mechanically coupled together, connections extending from the secondary windings of both transformers to the driving coils of both reproducers and arranged to deliver signals to said coils in a manner to cause movements of the diaphragms of said reproducers in proportion to left sound waves and right sound waves, respectively, a first tapped resistor connected in shunt with each driving coil of each reproducer, a second tapped resistor connected in series between the second terminal of the first driving coil of each reproducer and the first terminal of the second driving coil of the same reproducer, the taps of said second resistors being connected to a point of fixed potential, and negative feedback paths extending from the taps of said first resistors, through summing resistors, to early stages of said amplifiers, said summing resistors being proportioned and interconnected to deliver a sum feedback signal to said first amplifier and a difference feedback signal to said second amplifier.

9. In a two-channel stereophonic system for audibly reproducing a left sound wave and a right sound wave from received sum and difference signals, a first amplifier for received sum signals, a second amplifier for received difference signals, a left reproducer and a right reproducer, each reproducer having two electrically independent driving coils that are mechanically coupled together, a conjugate network intercoupling both of said amplifiers with all of said coils in a fashion to recombine said received signals additively in said left reproducer and subtractively in said right reproducer, a resistor network connected to both driving coils of each reproducer, said network including means, in the case of each driving coil, for deriving a sample of the voltage across that coil and the current flowing through it, means for additively combining said samples to provide a negative feedback signal for said first amplifier, and means for subtractively combining said samples to provide a negative feedback signal for said second amplifier.

10. In a two-channel stereophonic system for audibly reproducing a left sound wave and a right sound wave from received sum and difference signals, a first amplifier for received sum signals, a second amplifier for received difference signals, a left reproducer and a right reproducer, each reproducer having two electrically independent driving coils that are mechanically coupled together, a conjugate network intercoupling both of said amplifiers with all of said coils in a fashion to recombine said received signals additively in said left reproducer and subtractively in said right reproducer, a resistor network connected to both driving coils of each reproducer, said network including means, in the case of each driving coil, for deriving a sample of the voltage across that coil and the current flowing through it, means for subtractively feeding back to two different input points of a single early stage of the first amplifier a left reproducer sample in one phase and a right reproducer sample in opposite phase, and means for additively feeding back to two different input points of two different stages of the second amplifier a left reproducer sample in one phase and a right reproducer sample in the same phase.

References Cited in the file of this patent

UNITED STATES PATENTS

| | | |
|---|---|---|
| 2,062,275 | Blumlein | Nov. 24, 1936 |
| 2,093,540 | Blumlein | Sept. 21, 1937 |
| 2,845,491 | Bertram | July 29, 1958 |
| 2,904,632 | Levy | Sept. 15, 1959 |

OTHER REFERENCES

Compatible Stereo for AM Stations: Electronics World; May 1959, page 86.

Shottenfeld: The "Stereo Plus" System; Audio, October 1959, pages 23, 114–116.